(12) United States Patent
Nevitt

(10) Patent No.: US 9,010,276 B1
(45) Date of Patent: Apr. 21, 2015

(54) VACUUM BRUSH

(71) Applicant: Bryant D. Nevitt, Winchester, CA (US)

(72) Inventor: Bryant D. Nevitt, Winchester, CA (US)

(*) Notice: Subject to any disclaimer, the term of this patent is extended or adjusted under 35 U.S.C. 154(b) by 271 days.

(21) Appl. No.: 13/621,616

(22) Filed: Sep. 17, 2012

(51) Int. Cl.
- *A45D 24/10* (2006.01)
- *A47L 9/06* (2006.01)
- *A01K 13/00* (2006.01)
- *A45D 24/32* (2006.01)

(52) U.S. Cl.
CPC ............ *A01K 13/00* (2013.01); *A45D 24/32* (2013.01)

(58) Field of Classification Search
USPC ........... 401/39; 119/611–616, 625, 606, 631, 119/632; 15/363, 393, 400, 256.52; 132/151, 271
See application file for complete search history.

(56) References Cited

U.S. PATENT DOCUMENTS

| | | | | |
|---|---|---|---|---|
| 1,597,855 | A * | 8/1926 | Zahorsky | 15/400 |
| 2,228,091 | A * | 1/1941 | Smith | 15/402 |
| 2,392,645 | A * | 1/1946 | Clobridge | 68/222 |
| 3,057,364 | A * | 10/1962 | Freedman et al. | 34/96 |
| 3,308,500 | A * | 3/1967 | Woodruff | 15/369 |
| 3,955,238 | A * | 5/1976 | Remijas | 15/402 |
| 4,100,644 | A * | 7/1978 | Johansson | 15/397 |
| 4,630,329 | A * | 12/1986 | Shores | 15/368 |
| 5,546,674 | A * | 8/1996 | Lange et al. | 34/97 |
| 5,862,780 | A * | 1/1999 | Landreneau | 119/616 |
| 6,082,307 | A * | 7/2000 | Landreneau | 119/616 |
| 7,159,274 | B2 * | 1/2007 | Freidell | 15/339 |
| 2010/0294210 | A1 | 11/2010 | Dyson et al. | |
| 2011/0030620 | A1 * | 2/2011 | Jouan | 119/611 |
| 2012/0285395 | A1 * | 11/2012 | Freidell | 119/625 |
| 2013/0145992 | A1 * | 6/2013 | Liang et al. | 119/608 |

* cited by examiner

*Primary Examiner* — Kristen C Hayes
(74) *Attorney, Agent, or Firm* — Patent Law Venture Group; Gene Scott

(57) ABSTRACT

A brush having a tubular housing and a comb rotationally mounted within a nozzle inlet of the housing, the comb having a plurality of channels there through with bristles secured to the comb between pairs of the channels, and a pivotal lever engaged with the comb for rotation between obverse and inverse positions.

6 Claims, 5 Drawing Sheets

VACUUM BRUSH

No federally sponsored research or development, and no sequence listing, table, or computer program listing compact disc appendix is applicable to this application.

BACKGROUND

This disclosure relates to the field of animal grooming especially of dogs. Animal grooming is an important function for their health and well-being. This summary is directly related to domestic pets and especially to dogs, but it also applies to other animals and to humans as well. Brushing is an important part of dog care. Depending on the breed, age, and health of a dog, brushing should be a daily activity. Many breeds require significantly less brushing, but regular brushing helps to ensure that the dog is healthy and comfortable. The primary reasons for brushing include: checking for health problems, general cleanliness, forging a close bond between dog and owner, and reducing parasitic infestation. Dog brushes come in various sizes and shapes and are made of metal, plastic and wood and are best used for breeds that have long and fragile hair. Common types are the curry brush, bristle brush, wire pin brush, and slicker brush. A curry brush is a tool made of rubber or plastic with short teeth. It is rubbed, or curried over a dog's coat to loosen dirt, hair, and other detritus, and to stimulate the skin into producing natural oils. It is also used for untangling knots in a dog's ears, paws or tail. The bristle brush is widely used because it can be applied to any type of coat. As a general rule, longer and widely-spaced bristles are suitable for dogs with longer coats and shorter and tightly-packed ones are better to use on dogs with short hair. Typically, the bristle brush is used on dogs with long coats to finish the coat and to bring out the natural luster and shine of the coat. It is commonly used in daily grooming as it removes surface dust and dirt. The wire pin brush has oval shaped pins that are set in a flexible rubber base. The pins should be polished or coated to prevent scratching the dog's skin. This type of brush is used for dogs with long, wiry, wavy and curly coats as it is useful in separating and untangling the coat. A slicker brush is typically used after preliminary brushing with a bristle or a wire pin brush. It has fine wire pins that are secured to a flat base and the pins are medially bent at an angle. It is used for long coats and those with curly hairs to smooth the coat and to take out mats and tangles.

One problem with grooming animals is that hairs, foreign materials, infestations and other matter, including possibly disease bearing parasites are removed during the brushing process and it is inconvenient, if not dangerous to deal with this dislodged matter during brushing and when cleaning the brush. The presently described apparatus provides a simple and effective solution where dislodged material is moved to trash during brushing operations, and very little, if any, brush cleaning is necessary.

BRIEF SUMMARY AND OBJECTIVES

The present disclosure describes an apparatus and method for manual brushing of animals especially those with long hair or with thick coats and for the disposal of loosened or dislodged matter as part of, and during, brushing.

The apparatus is a brush for use with a vacuum cleaner and has one or more reversible mechanical combs which enable vacuum induced air flow to move through channels in the combs which cleans the combs during use. Advantages include simplicity of construction and operation, disposal of hair and other matter caught in the brush at the same time that the brushing process is executed, and forcing air flow through channels in the comb so that materials are dislodged from the comb by air flow when the comb in inverted.

The details of one or more embodiments of these concepts are set forth in the accompanying drawings and the description below. Other features, objects, and advantages of these concepts will be apparent from the description and drawings, and from the claims.

BRIEF DESCRIPTION OF THE SEVERAL VIEWS OF THE DRAWING

Like reference symbols in the various drawings indicate like elements.

DETAILED DESCRIPTION

Figure 1:
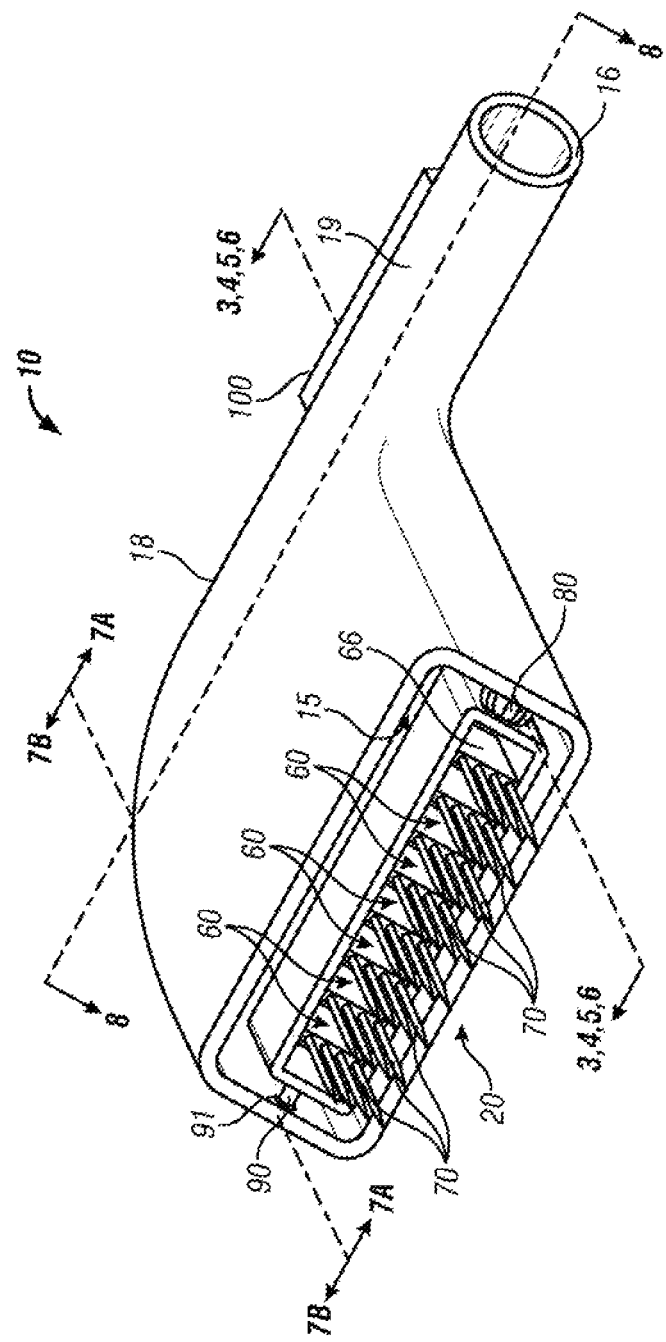
FIG. 1 is an example perspective view of the presently described vacuum brush apparatus.
Figure 2:
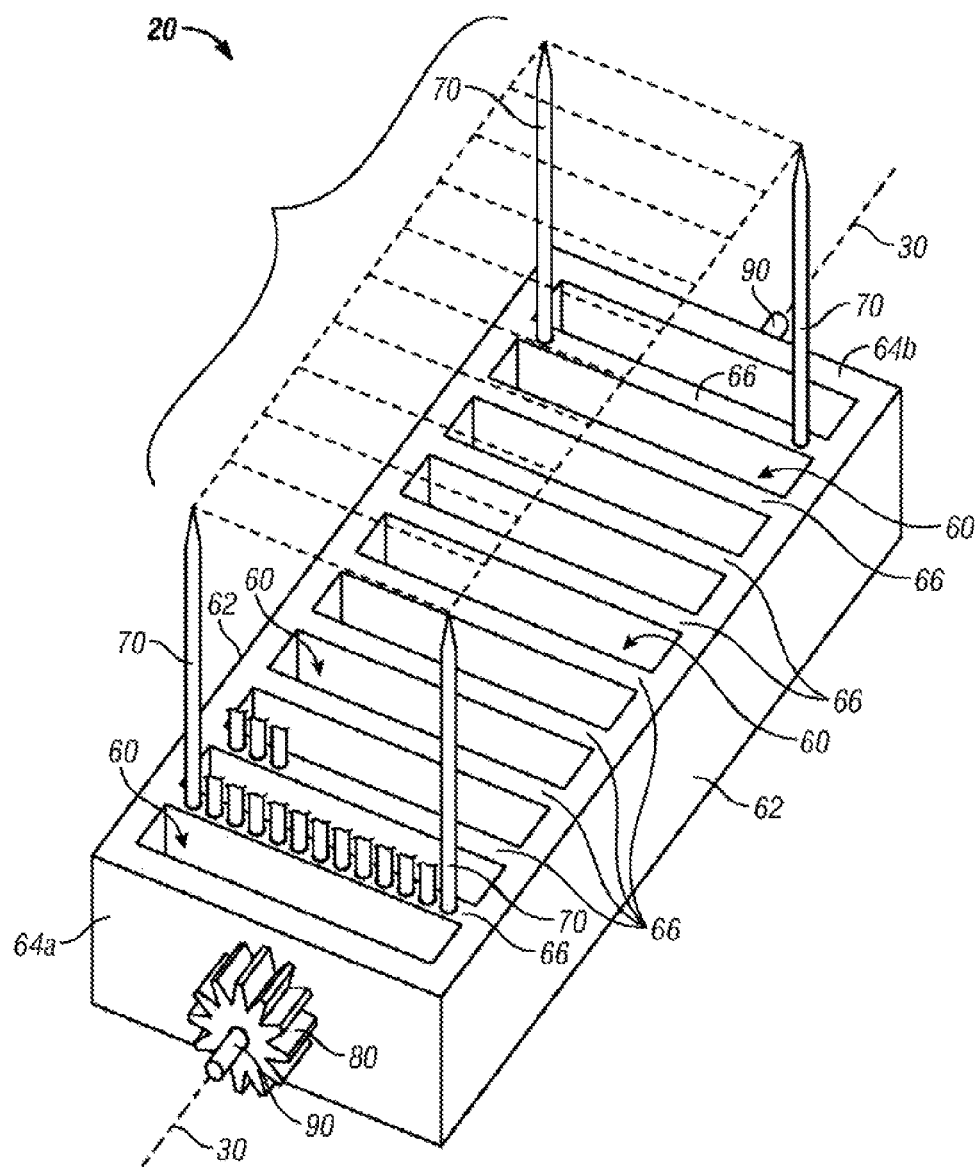
FIG. 2 is an example perspective view of a comb thereof.
Figure 3:
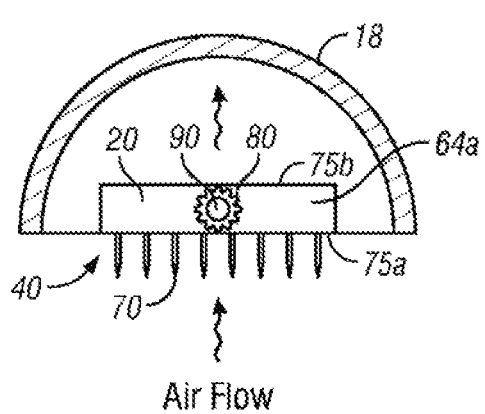
FIG. 3 is an example of a cross-sectional view taken along cutting plane line 3-3 in FIG. 1 showing the comb in an obverse attitude.
Figure 4:
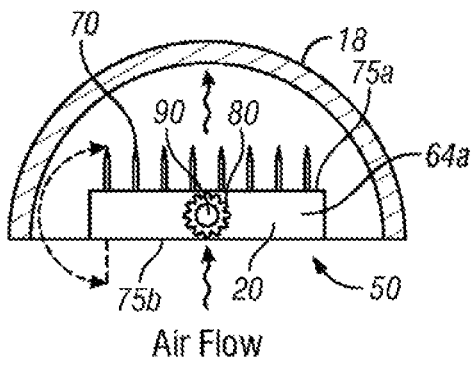
FIG. 4 is an example of a cross sectional view taken along cutting plane line 4-4 in FIG. 1 showing the comb in an inverse attitude.

FIG. 1 illustrates a hand-held, vacuum based, hair brushing apparatus (brush 10), directed toward pet grooming. A comb 20 of brush 10 is pivotally mounted at a nozzle inlet 15 of vacuum housing 18. FIG. 2 shows details of comb 20. Rotation of comb 20 pivots about longitudinal axis 30 between an obverse position as shown in FIG. 3, and a reverse position as shown in FIG. 4, wherein these positions are spaced apart by 180 angular degrees, as will be further explained.

Referring to FIG. 2, it is shown that comb 20 has a series of air ducts 60 and a plurality of bristles 70 with the bristles 70 arranged in rows permanently secured by their ends to comb 20 so that the bristles 70 extend uniformly away from comb 20 and out of an air nozzle inlet 15 as clearly shown in FIG. 1.

Comb 20 is defined by opposing side walls 62 and a first 64a and second 64b spaced-apart end walls, the side walls 62 and end walls 64a, 64b forming a rectangular frame as shown. A plurality of spaced apart medial walls 66 are engaged with, and extend between, side walls 62 and are arranged in parallel with end walls 64a, 64b. Air ducts 60 are bounded by side walls 62 and medial walls 66 forming channels through which air may be drawn during use of the brush 10. A first common surface of the side walls 62, end walls 64a and 64b, and medial walls 66 define a top 75a of comb 20, and a spaced apart second common surface of the same elements define a bottom 75b of comb 20, (refer to FIGS. 3, 4, 5, 6, 7A, and 7B). The top 75a and bottom 75b of comb 20 are arranged in mutually parallel planes and are spaced apart defining a thickness or height of comb 20. Air flowing through ducts 60 moves between the top 75a and bottom 75b of comb 20 when comb 20 is in the obverse orientation, and flows between the bottom 75b and top 75a when comb 20 is in the inverse orientation. The bristles 70 are arranged in rows secured to the medial walls 66 at the top 75a as shown in FIGS. 3 and 4, or both top 75a and bottom 75b (FIG. 5) of comb 20 whereby the bristles extend away from the top 75a and/or bottom 75b.

A sprocket 80 is formed as and relief or mounted on end wall 64a as shown in FIGS. 1-6 and 8. A stop-block 65 extends axially out from end wall 64b as shown in FIG. 7A. Axle stubs 90, aligned with longitudinal axis 30, extend laterally from each of end walls 64a and 64b.

As previously stated and shown, comb 20 is rotationally mounted and positioned within air nozzle inlet 15 of vacuum housing 18. It is shown in FIG. 1 that housing 18 is configured for convenient manual gripping about surface 19 so as to be manually drawn across and through the coat of a dog, cat, or other animal. Vacuum housing 18 is tubular in shape with nozzle inlet 15 positioned at one end and a vacuum hose coupling 16 at an opposing end. Coupling 16 is sized to be joined with a standard vacuum hose (not shown) so as to draw a flow of air through comb 20 and housing 18. An actuation lever 100 is pivotally mounted on housing 18 for controlling the position of comb 20 as will be explained.

Figure 5:
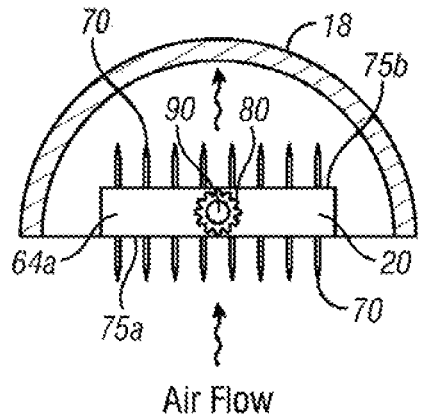
FIG. 5 is an example of a cross sectional view taken along cutting plane line 5-5 in FIG. 1 showing bristles mounted on opposing sides of the comb.
Figure 6:
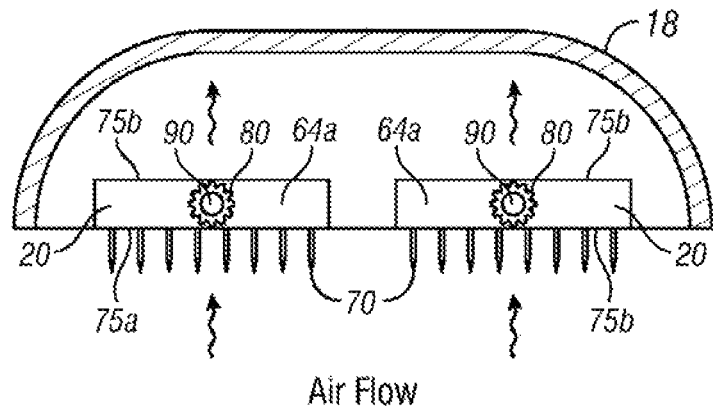
FIG. 6 is an example of a cross sectional view taken along cutting plane line 6-6 in FIG. 1 showing two combs in side-by-side positions and in obverse attitudes.
Figure 7A:
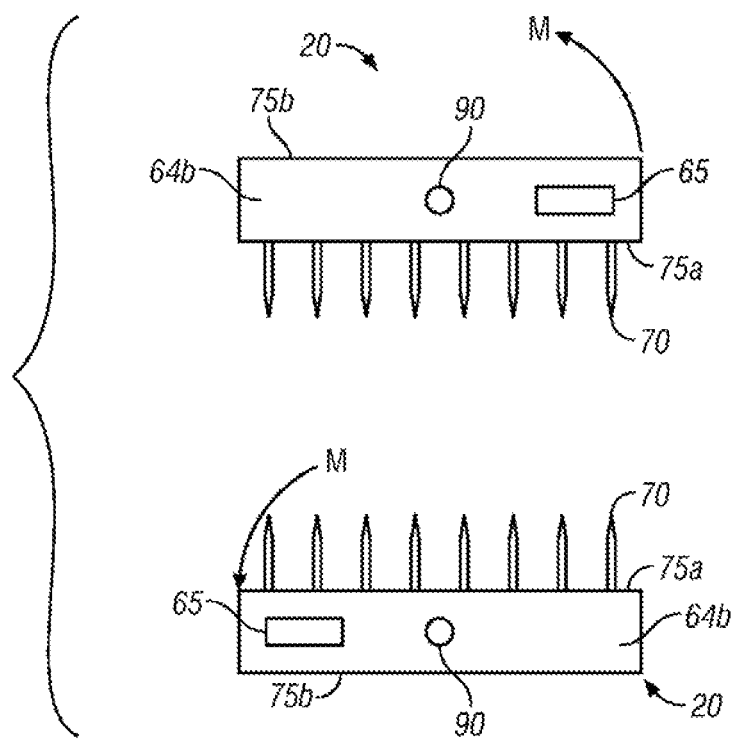
FIG. 7A is an example view of the comb taken along cutting plane line 7A-7A in FIG. 1 showing, at top, an obverse view of the comb, and below, an inverse view of the comb.

FIG. 6 shows an embodiment of the present apparatus wherein two combs 20 are positioned side-by-side. In this embodiment, both combs 20 are enabled to move simultaneously between obverse to inverse positions. Clearly, more than two combs 20 might be used in a further embodiment. In FIGS. 2-6 the length of combs 20 is not shown and it would be clear to those of skill in the animal grooming arts to extend combs in both width an length to a size that is appropriate for particular grooming requirements.

Figure 7B:
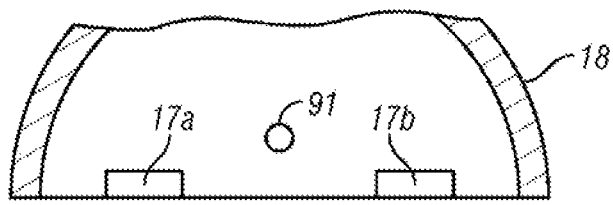
FIG. 7B is an example sectional view taken along cutting plane line 7B-7B in FIG. 1 showing a portion of an interior of a tubular housing of the apparatus.

FIG. 7A shows comb 20 in the obverse orientation at the top of the figure and in the inverse orientation at the bottom, while both representations are of the same comb 20 but shown in the manner by which comb 20 moves, according to arrow M from obverse to inverse attitudes. When moving from inverse to obverse attitudes, movement is in accordance with a reverse of the above described rotational motion. Axle stub 90 is shown as it protrudes away from end wall 64b. FIG. 7B shows a portion of an interior surface of housing 18. It is clear that axle stubs 90 are received within blind hole receivers 91 shown in FIG. 7B and FIG. 8 and it is about these stubs 90 that comb 20 rotates. The interior wall surface of housing 18 has two protruding stop blocks 17a and 17b. Stop block 65 of comb 20 comes into contact alternately with each of the stops 17a and 17b when comb 20 rotates between obverse and inverse attitudes respectively. In these two orientations of comb 20, as can be seen in FIG. 7, bristles 70 are positioned vertically down and vertically up respectively.

Figure 8:
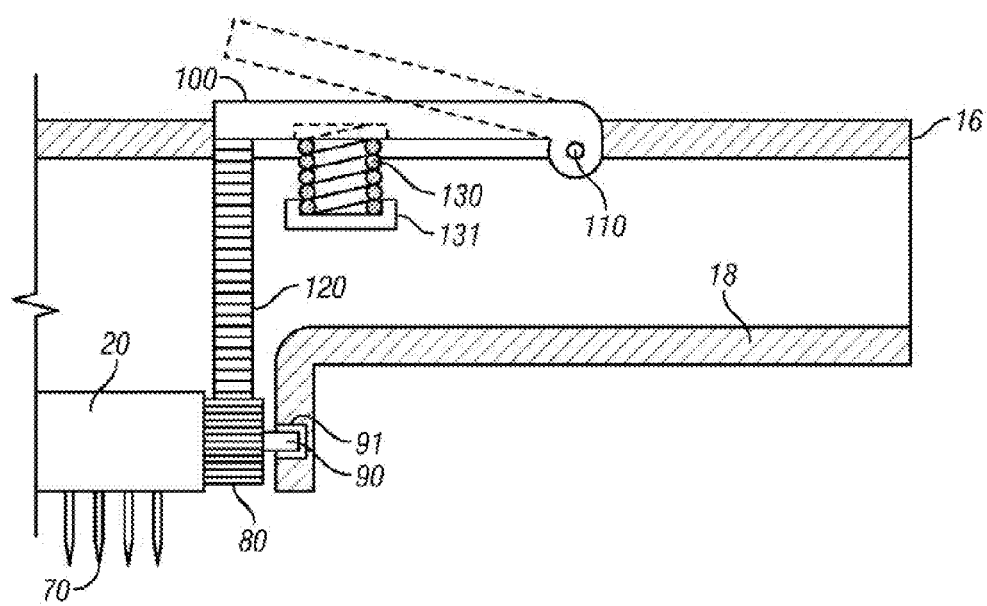
FIG. 8 is an example partial sectional view taken along cutting plane line 8-8 in FIG. 1.

FIG. 8 shows the means by which comb 20 is rotated. Lever 100 is hinged at 110 to housing 18 and is spring loaded by coil spring 130 to an "up" position (shown in dashed lines) when comb 20 is in the inverse attitude. When hand pressure presses down on lever 100 so that it assumes the position shown by solid lines in FIG. 8, a linear gear 120, which is engaged with handle 100 and sprocket 80 causes rotation of sprocket 80 placing comb 20 in the obverse orientation (shown) where bristles 70 extend out from nozzle inlet 15 and are positioned for combing. When hand pressure is withdrawn, spring 130 pushes handle 100 to its "up" position and rotates comb 20 back to its inverse orientation.

In use, brush 10 is connected to the hose of a vacuum cleaner and the cleaner is activated. This causes a vigorous air flow into nozzle inlet 15 and through the channels 60 of comb 20. When comb 20 is positioned in its obverse orientation (FIG. 1) brush 10 is able to be used to take one or more brush strokes through the coat of an animal, hair and other matter will typically be collected by and between bristles 70. This is desirable as it thins the animals coat and cleans it. The air flow causes these hairs and other matter to be secured in comb 20 as it compresses this material against top surface 75a. Some collected matter will, of course, move with air flow through comb 20 and be delivered into the vacuum equipment. When lever 100 is released, comb 20 rotates into the inverse position (FIG. 4) and the air flow now pushes any captured material off bristles 70 and into the cleaner. When this occurs, comb 20 is ready to be rotated again to start the next brushing cycle. Clearly, a brushing synchronization may be used in cycles including comb reversals interspersed with one or more brush strokes. As shown in FIG. 5, bristles 70 may be mounted on both the top 75a and also on the bottom 75b of comb 20. As bristles 70 may become damaged and worn with time, having two sets of bristles 70 will allow the comb 20 to last twice as long as one with bristles 70 on only one side of comb 20. As described in the background section above, it is well known to use more than one bristle type when grooming an animal. Therefore, a groomer may elect to have two different styles of brush bristles on opposing sides of comb 20 to enable the use of the present apparatus as two of a: curry brush, bristle brush, wire pin brush, and slicker brush. Therefore, a grooming procedure, for instance, may include the use of curry brush bristles at first on an animal followed later with the use of slicker brush bristles to complete the grooming job. Other combinations are of course possible.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. A brush comprising:
a tubular housing having a nozzle inlet and a suction outlet;
a comb rotationally mounted within said nozzle inlet, said comb having a row of air ducts extensive therethrough;
a plurality of spaced-apart, mutually parallel, rows of bristles fixed to said comb, with said air ducts positioned between pairs of said rows of bristles;
wherein, with said comb in an obverse position said bristles are directed out of said nozzle inlet, and with said comb in an inverse position by a 180° rotation of said comb from said obverse position, said bristles are directed inwardly into said nozzle inlet;
wherein, said comb and an interior wall surface of said tubular housing each have respective stop blocks positioned for stopping rotation of said comb at said obverse comb position and, alternately, at said inverse comb position.

2. The brush of claim 1 further comprising a lever operably engaged with said tubular housing and with said comb, wherein, operation of said lever rotates said comb between said stop blocks of said tubular housing, wherein said comb is positioned alternately in said obverse comb position and said inverse comb positions.

3. The brush of claim 1 wherein said comb comprises a pair of combs positioned in side-by-side juxtaposition.

4. A brush comprising:
a tubular housing having a nozzle inlet and a suction outlet;
a comb rotationally mounted within said nozzle inlet, said comb having a row of air ducts extensive therethrough;
a plurality of spaced-apart, mutually parallel, rows of bristles fixed to opposing sides of said comb, with said air ducts positioned in line with said rows of bristles and between pairs of said rows of bristles;

wherein, with said comb in either an obverse rotational position or an inverse rotational position, a portion of said bristles are directed out of said nozzle inlet and a further portion of said bristles are directed inwardly into said nozzle inlet;

wherein, said comb and an interior wall surface of said tubular housing each have respective stop blocks positioned for stopping rotation of said comb at said obverse comb position and, alternately, at said inverse comb position.

5. The brush of claim 4 further comprising a lever operably engaged with said tubular housing and with said comb, wherein, operation of said lever rotates said comb between said stop blocks of said tubular housing, wherein said comb is positioned alternately in said obverse comb position and said inverse comb positions.

6. The brush of claim 4 wherein said comb comprises a pair of combs positioned in side-by-side juxtaposition.

\* \* \* \* \*